(12) United States Patent
Trammell et al.

(10) Patent No.: US 8,027,744 B1
(45) Date of Patent: **\*Sep. 27, 2011**

(54) SYSTEMS AND METHODS FOR DESIGNING AND MANUFACTURING ENGINEERED OBJECTS

(75) Inventors: Leon Trammell, Towanda, KS (US); Hiroshi Takaki, Bellingham, WA (US)

(73) Assignee: Tramco, Inc., Wichita, KS (US)

( \* ) Notice: Subject to any disclaimer, the term of this patent is extended or adjusted under 35 U.S.C. 154(b) by 0 days.

This patent is subject to a terminal disclaimer.

(21) Appl. No.: 12/510,519

(22) Filed: Jul. 28, 2009

Related U.S. Application Data

(63) Continuation of application No. 12/070,603, filed on Feb. 19, 2008, now Pat. No. 7,567,849, which is a continuation of application No. 11/430,798, filed on May 9, 2006, now Pat. No. 7,333,868.

(60) Provisional application No. 60/679,447, filed on May 10, 2005.

(51) Int. Cl.
*G06F 19/00* (2006.01)
*G06F 17/50* (2006.01)

(52) U.S. Cl. ............... 700/97; 703/1; 706/919; 715/964

(58) Field of Classification Search ............... 700/95–98, 700/103–105; 706/903, 904, 906, 919–923; 703/1, 2; 715/964, 965; 716/1
See application file for complete search history.

(56) References Cited

U.S. PATENT DOCUMENTS

| | | | |
|---|---|---|---|
| 4,912,657 A | 3/1990 | Saxton et al. | |
| 5,197,120 A | 3/1993 | Saxton et al. | |
| 6,341,243 B1 | 1/2002 | Bourne et al. | |
| 6,490,498 B1 | 12/2002 | Takagi | |
| 6,560,499 B1 | 5/2003 | Demmer | |
| 6,804,568 B1 | 10/2004 | Miyazaki et al. | |
| 6,823,342 B2 | 11/2004 | Wallen et al. | |
| 6,836,699 B2 | 12/2004 | Lukis et al. | |
| 6,859,768 B1 | 2/2005 | Wakelam et al. | |
| 6,993,708 B1 | 1/2006 | Gillig | |
| 7,099,737 B2 | 8/2006 | Suh et al. | |
| 2002/0072821 A1 | 6/2002 | Baker | |

(Continued)

FOREIGN PATENT DOCUMENTS

CN    1362683 A    8/2002

(Continued)

OTHER PUBLICATIONS

Solidworks Corporation, "Solidworks Office Premium" Website, Apr. 2004, 2 pages.

*Primary Examiner* — M. N. Von Buhr
(74) *Attorney, Agent, or Firm* — Michael R. Schacht; Schacht Law Office, Inc.

(57) ABSTRACT

A design system for generating an object design for producing an engineered object, the design system includes an estimate generator, a layout drawing generator, and a design generator. The estimate generator generates a cost estimate based on at least one of a request for proposal defining the engineered object, components of the engineered object, and engineering rules and knowledge. The layout drawing generator generates a layout drawing based on at least one of the request for proposal, the engineered object, and engineering rules and knowledge. The design generator generates the object design based on a proposal and an order. The proposal is generated based on the cost estimate and the layout drawing. The order is generated based on the proposal.

19 Claims, 18 Drawing Sheets

U.S. PATENT DOCUMENTS

| | | |
|---|---|---|
| 2002/0114537 A1 | 8/2002 | Sutula, Jr. |
| 2002/0138167 A1 | 9/2002 | Uchida et al. |
| 2002/0183986 A1 | 12/2002 | Stewart et al. |
| 2003/0050726 A1 | 3/2003 | Jaffrey |
| 2003/0114952 A1 | 6/2003 | Scott |
| 2003/0115108 A1 | 6/2003 | Scott et al. |
| 2005/0080502 A1 | 4/2005 | Chernyak et al. |
| 2005/0125092 A1 | 6/2005 | Lukis et al. |
| 2006/0106757 A1 | 5/2006 | Sakai et al. |
| 2006/0129462 A1 | 6/2006 | Panki et al. |

FOREIGN PATENT DOCUMENTS

| | | |
|---|---|---|
| CN | 1367900 A | 9/2002 |
| CN | 1402173 A | 3/2003 |
| WO | 98/22897 A | 5/1998 |

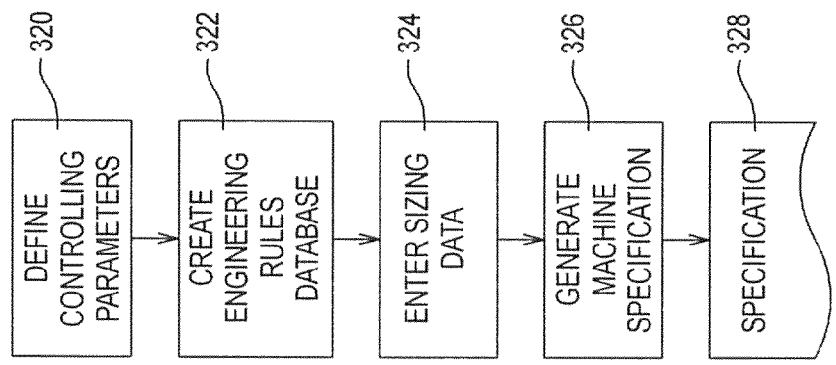
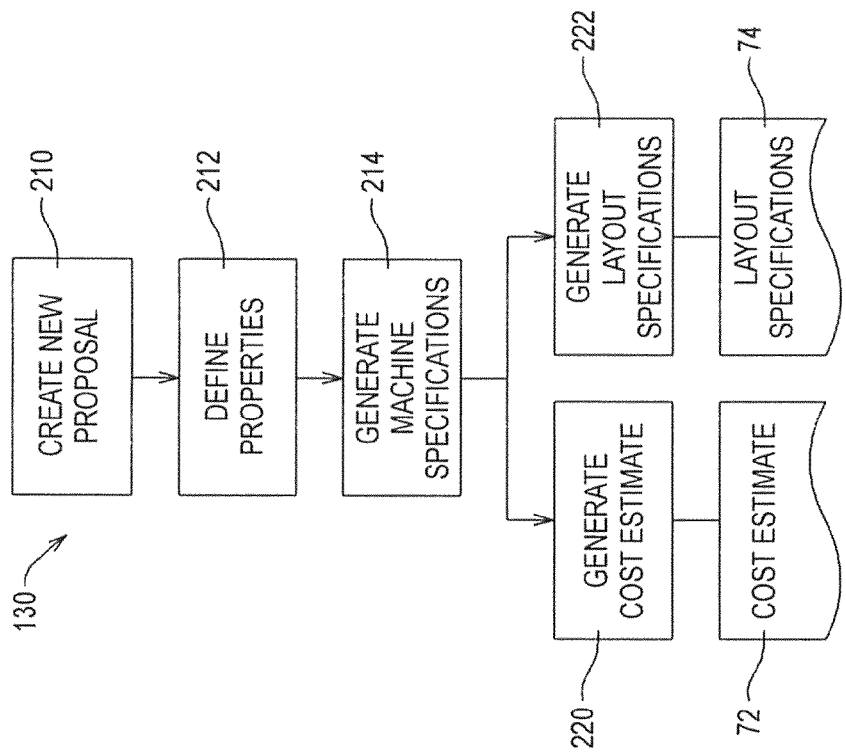

FIG. 3A

Main Form

Add/Update/Delete Customers
Order Spare Parts
Proposals and Jobs

System Settings

New Proposal

Customer Information | Product Information | Conveyor Information | Estimating

Select Customer [ABC ▼]   [Add Customer]

Customer Address
Select Address [124 A Street, ANY TOWN, WA> 99999 USA ▼]

Line 1 [123 A Street]
Line 2 [           ]          [Use Only Address 1 ▼]
City [ANY TOWN]  State [WA]  Zip [99999]  Country [USA]
Customer Phone [        ]  Customer Fax [        ]   [Add Address]
Customer E-mail [John@ABC.COM]                        [Edit Address]

Proposal No. [99999]  Contact Name [John Doe ▼]
Quote by: [Robert Heinrichs ▼]
Sign by: [Robert Heinrichs ▼]     Project Reference [Conveyor]

[Next>>]

| Support | | | | | | |
|---|---|---|---|---|---|---|
| Conv Requirements | Drive | Specifications | Pricing / Weights | Reports | Layout Dwg | |

Conveyor Model # [42" Tramroll]   Bushels/Hr [ ]   Length (Inlet to Discharge) [100 ft]   Total Conv Length [115.6 ft]   Rise [0]   Settings

Drive
Motor H.P. [15]
Reducer RPM Output [111]

Belt
Belt Width [42]
FPM [524]
Belt Length [242 ft]
Belt PIW [35]
Belt Description [42" Wide 3-Ply 330]
T1 Tension [1490.9]
T2 Tension [662.6]
Te [828.3]

Head
Pulley Dia [18]  ☑ STD?
Pulley Width [44]
Shaft Dia [2 15/16]
Shaft Length (apprx) [67.375]
Shaft RPM [111]
Pulley Traction Value [23]

Complete Conveyor
Cost [$29,428.00]
Weight [13,617 LBS]

Bearings
HEAD  Bore [2.9375]  Weight [25.3 lbs ea]
Description [1 - Dodge S-2000R 2-Bolt PB, Dodge Part # 44627]
            [1 - Dodge S-2000R 2-Bolt PB, Dodge Part # 44627]

TAIL  Bore [2.9375]  Weight [25.3 lbs ea]
Description [1 - Dodge S-2000R 2-Bolt PB, Dodge Part # 44655]
            [1 - Dodge S-2000R 2-Bolt PB, Dodge Part # 44655]

Tail
Pulley Dia [14]
Pulley Width [44]
Shaft Dia [2 15/16]
Shaft Length [65.375]
Shaft RPM [143]
Take-Up Travel [24"]

IDLER BEARINGS [40- 1 1/4" Dodge SC 2-Bolt Flange]

[Save and Close]

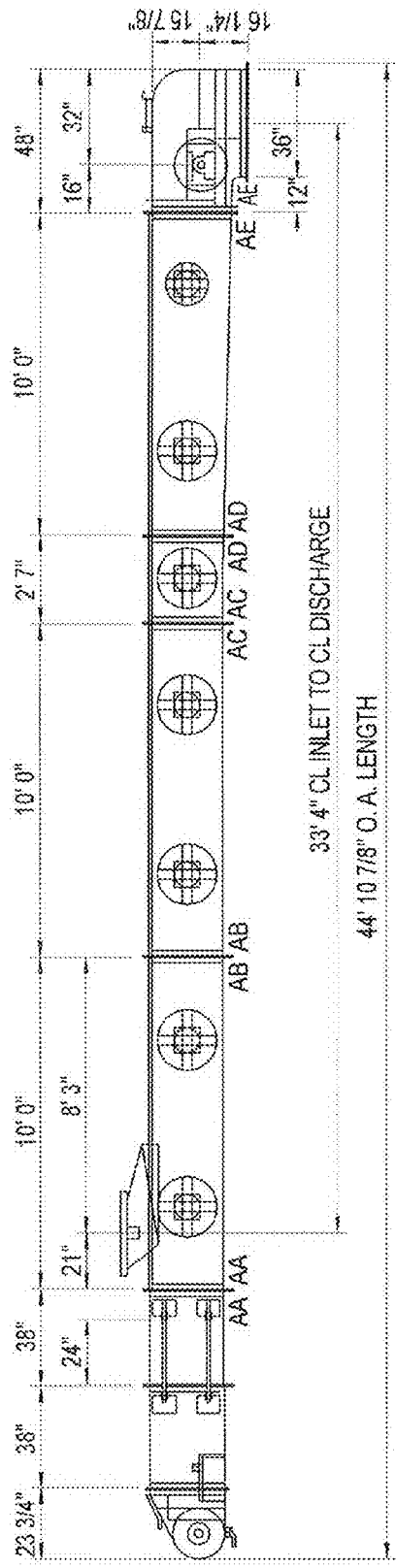

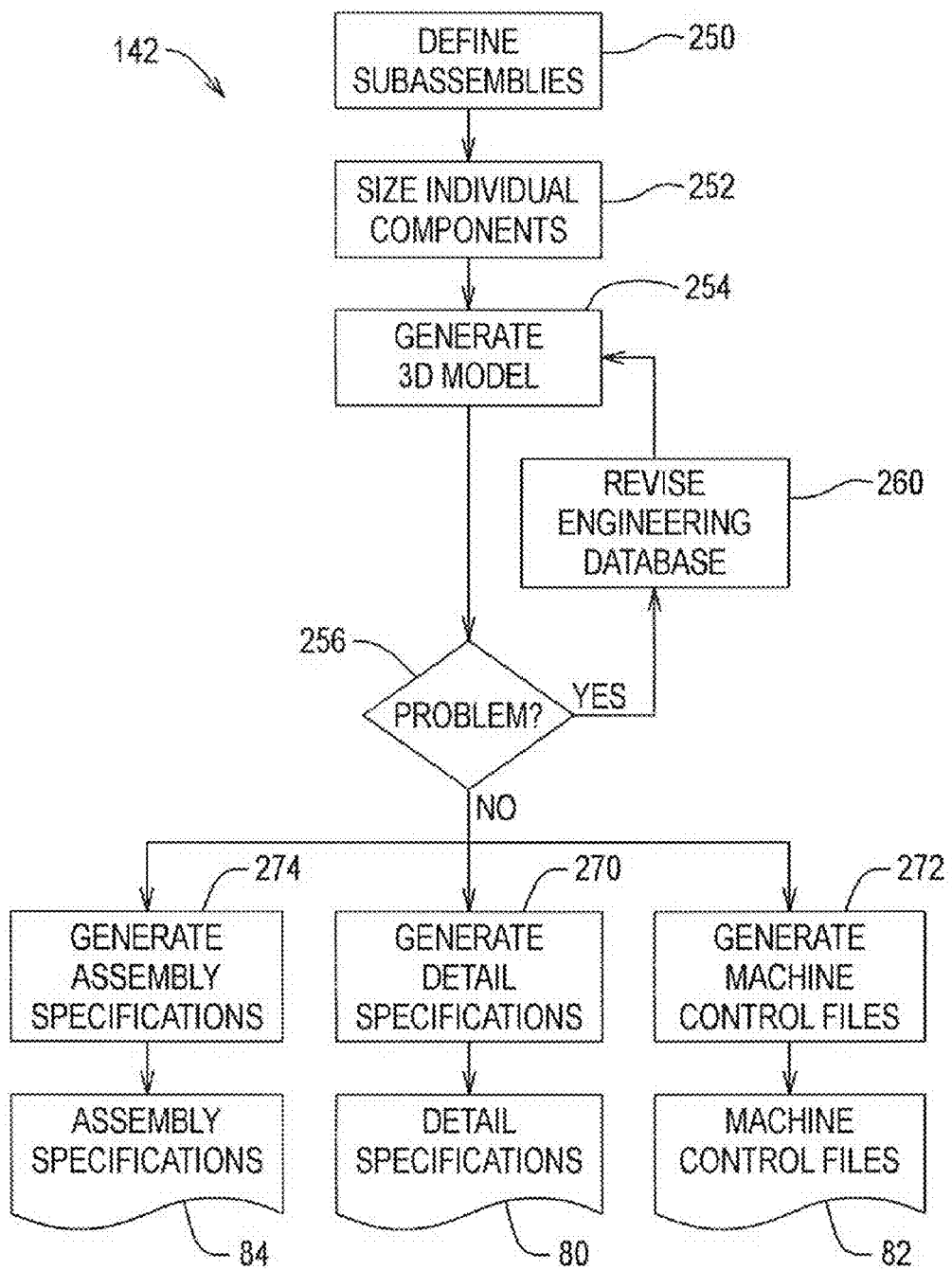

FIG. 4B

| | A | B | C | D |
|---|---|---|---|---|
| 1 | 3/10/2005 | TRAMROLL_TAILASSY | | |
| 2 | Header | xl name | output | assem? |
| 3 | $BEGIN | C:\TRAMCO\Tramroll\Excel\Excel\Tail\T | TRAMROLL-TAILASSY | TRUE |
| 4 | ** Enter Specifications from listed Options | | | |
| 5 | Belt Width | 18 | 18,24,30,36,42,48 | |
| 6 | Tail Housing thickness | 0.125 | fixed | |
| 7 | Shaft Diameter | 3.9375 | 2.4375,2.9375,3.4375,3.9375,4.4375,4.9375 | |
| 8 | Shaft Key Length | 8 | | |
| 9 | Takeup Travel Length | 24 | 24,48 | |
| 10 | Housing material | MS | MS,SS304,ss316 | |
| 11 | Supports? | YES | Distance from floor to btm of btm plate. | |
| 12 | Supports Size | 8 | | |
| 13 | Qty. | 1 | Min 1, Max 50 | |
| 14 | Units | English | | |
| 15 | | | | |
| 16 | | | | |
| 17 | | | | |

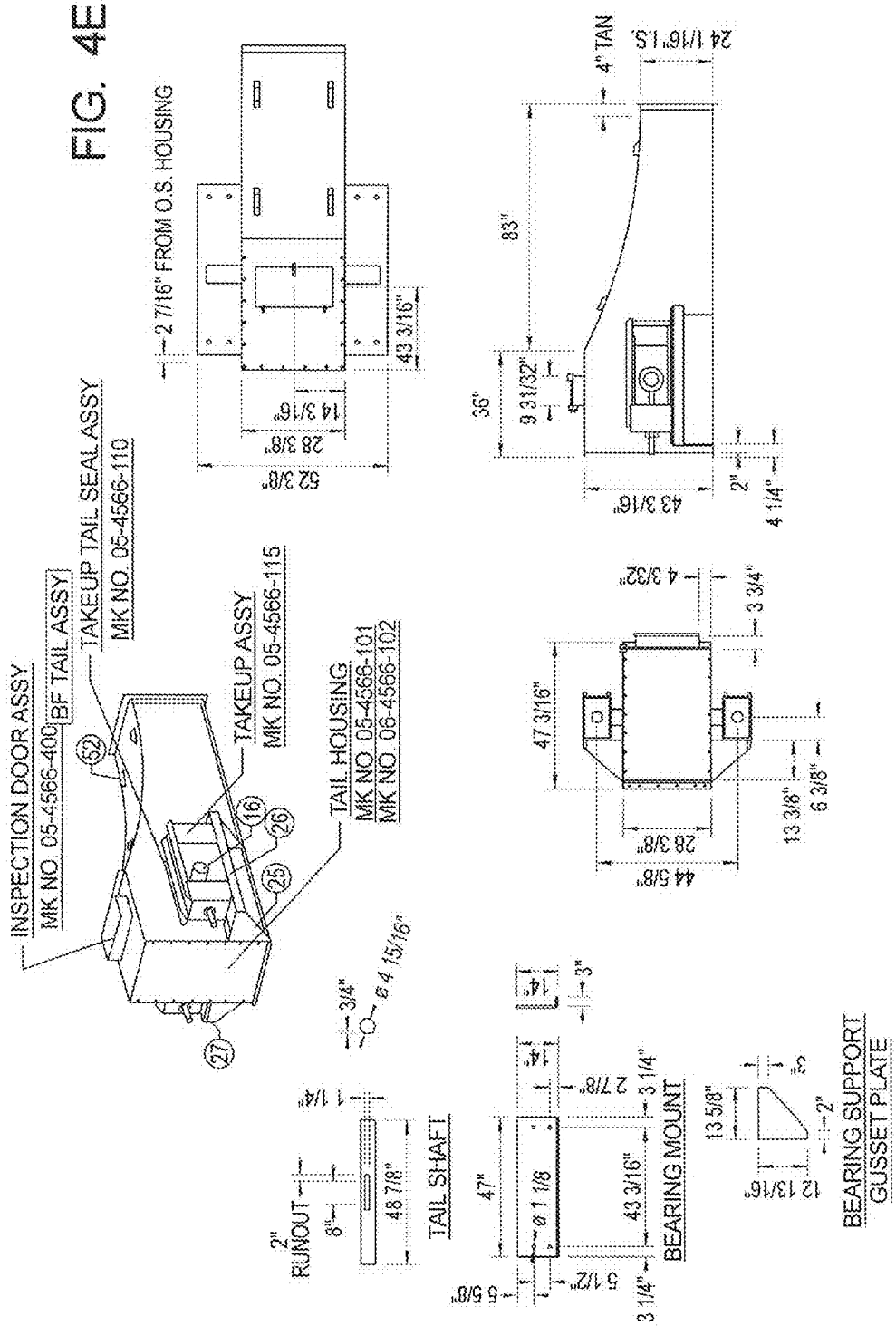

FIG. 4G

| ITEM NO. | QTY. | PART NUMBER | PART DESCRIPTION | STOCK SIZE |
|---|---|---|---|---|
| 16 | 1 | BTK024415-10084 | TAIL, SHAFT, 24W, 4-15/16, KEY8 3/16, SD | 4-15/16 DIA, ROD, 40.125L |
| 25 | 4 | BTJ-05-4566-1-AA | TAIL, BRNG, GUSSET | SHEET |
| 26 | 1 | BTJ100415-10000 | TAIL, BRNG, SPT, 4-15/16, RH | 15.875 X 47.000, SHEET, 3/8 |
| 27 | 1 | BTJ200415-10000 | TAIL, BRNG, SPT, 4-15/16, LH | 15.875 X 47.000, SHEET, 3/8 |
| 43 | 2 | GDD010020-10002 | DOOR, INSP, MNT, 10WX20L | 60 X 3.5, SHEET, 12GA |
| 44 | 1 | GDC010020-10002 | DOOR, INSP, 10WX20L | 22.375 X 12.375, SHEET, 12GA |
| 45 | 1 | NA | DOOR, INSP, LATCH | PURCHASE |
| 46 | 1 | 3205 | DOOR, INSP, TOP/BTM | PURCHASE |
| 47 | 1 | 3205 | DOOR, INSP, TOP/BTM | PURCHASE |
| 48 | 2 | GDE001000- | DOOR, INSP, HINGE | 1.500 X 1.750, SHEET, 10GA |
| 49 | 2 | GDE001000- | DOOR, INSP, HINGE | 1.500 X 1.750, SHEET, 10GA |

FIG. 4H

| BUY LIST | Quoted BY | Drawn By | DRAWING NO | 04-0-301 | | ORDER DATE | DUE DATE |
|---|---|---|---|---|---|---|---|
| | TH | RC | MODEL | GMODEL-18WX16H | | 8/1/2004 | 11/7/04 |
| Used for: | ITEM | QTY | PART NUMBER | DESCRIPTION | | TO DO | PURCHASE ORDER |
| Head Bearing/Eng | | 2 | 3873 | BRNG, DODGE, P4BS2207R, 2-7/16 <HEAD BEARING> | | BUY | |
| Head Bearing Support | | 2 | STANDARD | HD. BRNG. SUPPORT <HEAD BEARING SUPPORT> | | BUY | |
| Head Limit Switch | | 1 | 3390 | SWTCH, LIMIT, SD, 9007-CR53B2 (SHIP LOOSE) | | BUY/SHIP | |
| Head Limit SW Roller | | 1 | 3395 | SWTCH, ROLLER, ARM, SQ, D, HA-20 (SHIP LOOSE) | | BUY/SHIP | |
| TAIL/BRNG/E | | 2 | 3545 | BRNG, REX, ZT92215, TU, 2-15/16 <TAIL BEARING> | | BUY | |
| Alignment PINS | 6 | 24 | 10307 | PIN, ALIGNMENT, 3/8, COTTER (SHIP LOOSE) | | BUY/SHIP | |
| CouplingPINS | 7 | 9 | --- | CPLG PINS, TIT, SB155, HEAT-TREATED, W/COT (SHIP LOOSE) | | BUY/SHIP | |
| FLANGE BOLT | 11 | 48 | 10365 | BOLT, 1/2 X 1-1/2 <FLANGE> (SHIP LOOSE) | | BUY/SHIP | |
| COVER BOLT | 12 | 81 | 10180 | BOLT, 3/8 X 1 <COVER> (SHIP LOOSE) | | BUY/SHIP | |
| CB SPLICE BOLT | 13 | 2 | 10365 | BOLT, 1/2 X 1-1/2 <CB SPLICE> (SHIP LOOSE) | | BUY/SHIP | |
| MTR MNT BOLT | 14 | 4 | 10395 | BOLT, 3/8 X 1, CSK, SS316 <MOTOR> (SHIP LOOSE) | | BUY/SHIP | |
| GATE BOLT | 15 | 21 | 10365 | BOLT, 1/2 X 1-1/2 <GATE> (SHIP LOOSE) | | BUY/SHIP | |
| CAULKING | 16 | 2 | 3200 | CAULKING COMPOUND (SHIP LOOSE) | | BUY/SHIP | |
| MotorExpl | 17 | 1 | 40480 | MOTO, SMN, II-G, 100/1800/405 | | BUY | |
| Reducer/Dodge | 18 | 1 | 20095 | REDU, DODGE, TXT, 205, TB | | BUY | |
| SlideB-Dodge | 19 | 1 | 0 | Wrong Reducer type was selected Pick TCR type <REDUCER> | | BUY | |
| DrvBuShear | 20 | 1 | Drv Bush Part# | Driver Bushing Info? | | BUY | |
| DrvnBuShear | 21 | 1 | --- | Driven Bushing Info? | | BUY | |
| DrvSPin | 22 | 1 | 80038 | SPKT, RC-120C, 54W/SP-27 SHEAR (SHIP LOOSE) | | BUY | |
| DrvnSPin | 23 | 1 | 80038 | SPKT, RC-120C, 54W/SP-27 SHEAR (SHIP LOOSE) | | BUY | |
| SPHub | 24 | 1 | SP-29 | SP-29S.P.HUB ASSY, 11/32DIA, PIN | | BUY | |
| RollerChain | 25 | 22FT | 22196 | CHAIN, RC-240 W/(2)CONN LINKS | | BUY/SHIP | |

FIG. 41

| SHIPPING LIST | Quoted BY | Drawn By | DRAWING NO | 04-0-001 | | ORDER DATE | DUE DATE |
|---|---|---|---|---|---|---|---|
| | TH | RC | MODEL | GMODEL-18WX16H | | 8/1/2004 | 11/7/04 |
| Used for: | ITEM | QTY | PART NUMBER | DESCRIPTION | | | TO DO |
| Head Limit Switch | | 1 | 3390 | SWITCH, LIMIT, SD, 9007-CR53B2 (SHIP LOOSE) | | | BUY/SHP |
| Head Limit SW Roller | | 1 | 3395 | SWITCH, ROLLER ARM, SQ. D, HA-20 (SHIP LOOSE) | | | BUY/SHP |
| Alignment PINS | 6 | 24 | 10307 | PIN, ALIGNMENT, 3/8, COTTER (SHIP LOOSE) | | | BUY/SHP |
| Coupling PINS | 7 | 9 | --- | CPLG PINS, TIT, SB155, HEAT-TREATED W/COT (SHIP LOOSE) | | | BUY/SHP |
| FLANGE BOLT | 11 | 48 | 10365 | BOLT, 1/2 X 1-1/2 <FLANGE> (SHIP LOOSE) | | | BUY/SHP |
| COVER BOLT | 12 | 81 | 10180 | BOLT, 3/8 X 1 <COVER> (SHIP LOOSE) | | | BUY/SHP |
| CB SPLICE BOLT | 13 | 2 | 10365 | BOLT, 1/2 X 1-1/2 <CB SPLICE> (SHIP LOOSE) | | | BUY/SHP |
| MTR MNT BOLT | 14 | 4 | 10395 | BOLT, 3/8 X 1, CSK, SS316 <MOTOR> (SHIP LOOSE) | | | BUY/SHP |
| GATE BOLT | 15 | 21 | 10365 | BOLT, 1/2 X 1-1/2 <GATE> (SHIP LOOSE) | | | BUY/SHP |
| CAULKING | 16 | 2 | 3200 | CAULKING COMPOUND (SHIP LOOSE) | | | BUY/SHP |
| RollerChain | 25 | 22FT | 22196 | CHAIN, RC-240 W/(2)CONN LINKS | | | BUY/SHP |
| ChainCase | 27 | 1 | 02-2022-001-006 | OIL TIGHT CHAIN CASE (SHIP LOOSE) | | | FAB/SHIP |
| MANUAL | 29 | 2 | GMXXXX | INSTALLATION AND MAINTENANCE MANUALS (SHIP LOOSE) | | | SHIP |
| SUPPORT | 30 | 4 PRS. | GLB00006-1000 | SPT, 06H, ASS'Y <SUPPORT> (SHIP LOOSE) | | | FAB/SHIP |

FIG. 4J

| SHIPPING LIST | Quoted By | Drawn By | DRAWING NO | 04-0-001 | | ORDER DATE | DUE DATE |
|---|---|---|---|---|---|---|---|
| | TH | RC | MODEL | GMODEL-18WX16H | | 8/1/2004 | 11/7/04 |
| Used for: | ITEM | QTY | PART NUMBER | DESCRIPTION | | | |
| Head Ass'y | 1 | 1 | GHA1816401 0211 | HD. TAIL, 18WX16H, 4-7/162, ASS'Y <HEAD ASS'Y> | | | FAB |
| Head Shaft/Eng | | 1 | 04-0-001-002 | HD. SHAFT, 4-7/16, 36 LG. <HEAD SHAFT> | | | FAB |
| Head Sprocket | | 1 | TRAMCO | 12TWH124, 4-7/16, SPLIT SPROCKET W/B.K., S.S., H.T. | | | FAB |
| Head RINO Seal | | 2 | GRB0014 07-10001 | RINO. SEAL, HD. 4-7/16, ASS'Y | | | FAB |
| Tail Ass'y | 2 | 1 | GTA1816 21510001 | TAIL, 18WX16H, 2-15/162, ASS'Y <TAIL ASS'Y> | | | FAB |
| TAIL/SHFT | | 1 | GTP01 8215-10081 | TAIL. SHAFT, 18W,8KEY, 2-15/16 (36.125"LG.) <TAIL SHAFT> | | | FAB |
| TAIL/SPKT/E | | 1 | TRAMCO | 12TWH124, 2-15/16, SPLIT SPROCKET W/B.K., S.S., H.T. | | | FAB |
| TAIL/RINO | | 2 | GRB00 2215-10001 | RINO. SEAL, TAIL, 2-15/16, ASS'Y | | | FAB |
| TAIL/TKUP | | 2 | GUA00 0215-10081 | TU. PULL 2-15/16X8 TRAVEL ASS'Y <TAIL TAKEUP> | | | FAB |
| INTM/STRGT | 3 | 2 | GSA1816 10-10011 | INT, 18WX16H, 120L, ASS'Y | | | FAB |
| CB Splice Angle | 4 | 2 PRS. | GAB180 000-10001 | CB SPLICE. ANG, 16H, ASS'Y | | | FAB |
| CHAIN | 5 | 5 | | WH124, CHAIN, 10'-0"KG., 4 PITCH, 12.00" SPACING | | | |

FIG. 4K

CONVEYOR DA

| | |
|---|---|
| CUSTOMER P.O. NO. | 9900453 |
| CUSTOMER I.D. | |
| CONVEYOR SIZE | 3" X 5" BULK-FLO CHAIN C |
| CONVEYOR LENGTH | |
| CONVEYOR SPEED | 30 FPM |
| CONVEYOR CHAIN | 102-NA |
| CONVEYOR CAPACITY | 20 CUFT/HR 16 BU/HR 1T |
| MATERIAL | ROCKS/COTTONSEED & PEAN |
| HEAD SHAFT SIZE | 3 7/16" DIA. |
| HEAD SHAFT SPEED | 5.63 R.P.M |
| H.P. REQUIRED | 5 H.P. |
| LINER THICKNESS | N/A |
| NOTES: | |
| CONVEYOR SERIAL NO. | BF-766 |

-FINAL DRAWING-
RELEASED FOR CONSTRUCTION
DATE: 12/8/99
FABRICATION IS PROCEEDING IN ACCORDANCE WITH INFORMATION SHOWN ON THIS DRAWING. CHANGES MAY RESULT IN DELAYED SHIPMENT AND ADDITIONAL CHARGES.

~START-UP NOTES:~

1.) CHECK ALL TROUGH INTERIOR SURFACES FOR ALIGNMENT BEFORE START-UP.
2.) CHECK ALL CARRY-BACK JOINTS FOR PROPER ALIGNMENT BEFORE START-UP.
3.) ADJUST CHAIN TENSION BEFORE START-UP.
4.) CHECK INTERIOR OF CONVEYOR FOR FOREIGN OBJECTS BEFORE START-UP.
5.) DO NOT ATTEMPT TO WORK ON THIS CONVEYOR UNLESS MOTOR HAS BEEN LOCKED OUT!!!

~GENERAL NOTES:~

6.) CONVEYOR CHAIN TAKE-UP ASSEMBLIES TO HAVE CONTRASTING COLOR FLIGHTS.
7.) CONVEYOR COMPONENTS TO BE CHEMICAL WASHED. (FREE OF ALL WELD SPLATTER, DIRT, OIL AND RUST), BEFORE APPLICATION OF TRAMCO STANDARD PAINT SYSTEM. (1 1/2 MILS DFT).
8.) CONVEYOR EXTERNAL HARDWARE. (ALL BOLTS, NUTS, WASHERS, BEARINGS, ETC.), TO BE FREE OF PRIMER AND PAINT. (INSTALL AFTER PAINTING PROCEDURE).
9.) CONVEYOR CHAIN AND FLIGHT ASSEMBLIES TO BE WIRED IN PLACE FOR SHIPMENT.

SYSTEMS AND METHODS FOR DESIGNING AND MANUFACTURING ENGINEERED OBJECTS

RELATED APPLICATIONS

This application is a continuation of U.S. Ser. No. 12/070,603 filed Feb. 19, 2008, now U.S. Pat. No. 7,567,849, which is a continuation of U.S. Ser. No. 11/430,798 filed May 9, 2006, now U.S. Pat. No. 7,333,868 issued Feb. 19, 2008, which claims priority of U.S. Provisional Patent Application No. 60/679,447 which was filed on May 10, 2005. The contents of all related applications listed above are incorporated herein by reference.

TECHNICAL FIELD

The present invention relates to systems and methods of designing and manufacturing engineered objects and, more specifically, to design and manufacturing systems and methods for manufacturing engineered objects based on a customer-approved design.

BACKGROUND OF THE INVENTION

The term "object" is used herein to refer to a mechanical, electrical, or chemical component or any combination of such components. The term "engineered" as used herein refers to an object at least some aspect of which is specifically engineered to suit the requirements of a particular customer.

The present invention is of particular significance in the context of the design and manufacturing of bulk material handling systems such as the type typically used in a manufacturing environment to carry material from one location to another. The present invention will thus be described herein using the example of a system or method of designing and manufacturing an engineered object taking the form a bulk material handling system. However, the example presented herein is described for illustrative purposes only, and the present invention may take forms than the illustrative example described below.

A bulk material handling system typically requires the combination of mechanical and electrical components and material properties into an overall system that fits the particular working environment of a specific customer. Although many of the components used in a bulk material handling system are standardized, each particular design requires custom engineering. A bulk material handling system thus meets the definition of an engineered object as set forth above.

Conventionally, the design and manufacturing of a bulk material handling system involves the services of a salesman and an engineering department. The conventional process of designing and manufacturing a bulk material handling system may be described as follows.

Initially, the customer sends to the salesman a Request For Quotation (RFQ) containing the requirements of a proposed new bulk material handling system. The salesman works with the engineering department to generate a proposal based on the RFQ. The proposal contains engineering specifications defining the proposed new bulk material handling system and a quote of the price. The proposal typically may take up to several days to generate. The customer places an order when the proposal is accepted.

After the order is placed, the engineering department generates approval layout drawings based on the approved engineering specifications. The customer confirms that the approval layout drawings are accurate, and, if not, the approval layout drawings may be revised. The approval layout, drawings are commonly produced based on finished job drawings for similar bulk material handling systems that have been hand-modified based on the specifications defined by the order.

Once the approval layout drawings are finalized, the engineering staff will generate detail manufacturing drawings and associated documents. From the detail manufacturing drawings, CNC-ready files are created for the cutting of sheet metal. The sheet metal and other components such as motors or the like JO are then combined with the sheet metal components based on the detail manufacturing drawings. The finished bulk material handling system is then installed at the customer's site.

The Applicant has identified at least the follow problems with conventional systems and methods for designing and manufacturing bulk material handling is systems.

First, the step of generating the proposal requires the involvement of highly experienced engineering staff for at least several hours and often several days. The use of experienced engineering staff is expensive, and the fact that the proposal may take several days to prepare may place the manufacturer at a competitive disadvantage. Second, even with involvement of engineers for many hours, the preliminary specifications, without the approval drawings, do not include the detail drawings required for manufacture. The use of preliminary specifications to create the proposal creates the potential for costly design mistakes and inaccuracies in the quote. Third, the step of generating approval drawings can take several iterations over the period of one to two weeks. Fourth, the step of generating the detail manufacturing drawings based on prior finished job drawings for other projects often resulted in components that did not fit together or match the approval drawings.

The conventional process of designing and manufacturing a bulk material handling system is thus time consuming, requires significant highly technical labor simply to prepare a proposal, and is susceptible to design errors that are difficult and costly to fix. The need thus exists for improved systems and methods of designing and manufacturing engineered objects such as bulk material handling systems.

SUMMARY OF THE INVENTION

The invention may be embodied as a design system for generating an object design for producing an engineered object including an estimate generator, a layout drawing generator, and a design generator. The estimate generator generates a cost estimate based on at least one of a request for proposal defining the engineered object, components of the engineered object, and engineering rules and knowledge. The layout drawing generator generates a layout drawing based on at least one of the request for proposal, the engineered object, and engineering rules and knowledge. The design generator generates the object design based on a proposal and an order. The proposal is generated based on the cost estimate and the layout drawing. The order is generated based on the proposal.

BRIEF DESCRIPTION OF THE DRAWINGS

FIG. 3 is a flow diagram depicting one of the steps of the method of FIG. 2 in further detail;

FIGS. 3A-C are screen shots depicting software panels that may be generated by the system of FIG.

FIG. 3D is an example layout diagram generated by the system of FIG. 1;

FIG. 4 is a flow diagram depicting one of the steps of the method of FIG. 2 in further detail;

FIGS. 4A and 4B are screen shots depicting software panels that may be generated by the system of FIG. 1;

FIGS. 4E and 4F are two-dimensional drawings generated based on the example three-dimensional model of FIG. 4C;

FIGS. 4G-J are tables depicting examples of a bill of materials, buy list, ship list, and fabrication list generated by the system of FIG. 1;

FIG. 4K is a drawing containing assembly specifications generated by the system of FIG. 1; and FIG. 5 is a flow chart depicting the operation of an example parametric design system that may form part of or be used by the system of FIG. 1.

DETAILED DESCRIPTION OF THE INVENTION

Figure 1:
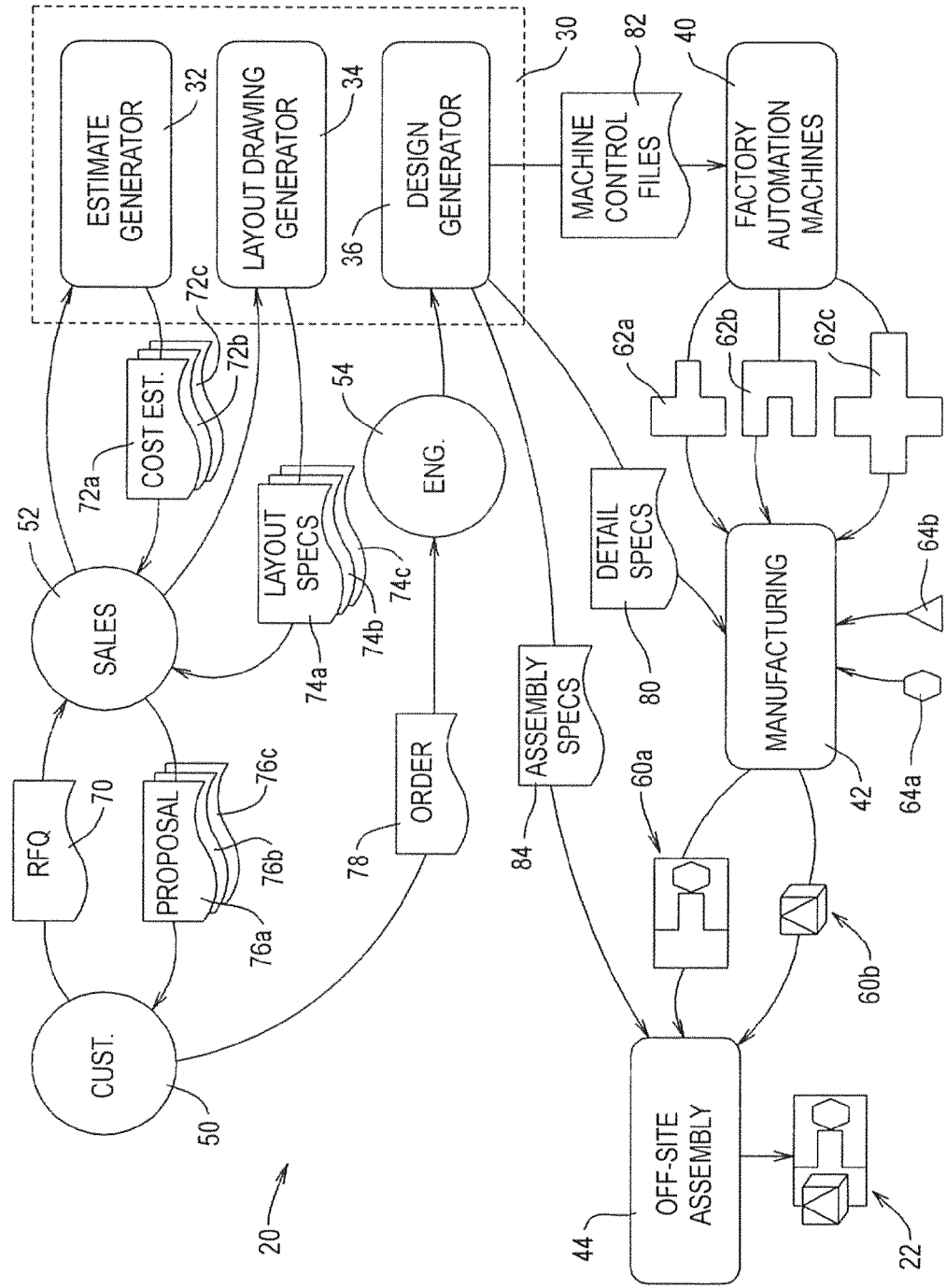
FIG. 1 is block diagram depicting a system designing and manufacturing an engineered object.

Referring initially to FIG. 1, depicted therein is a design and manufacturing system 20 constructed in accordance with, and embodying, the principles of the present invention. The example design and manufacturing system 20 is illustrated in the context of a method of designing and manufacturing of an engineered object 22, which, in the detailed example that will be described below, takes the form of a bulk material handling system.

The design and manufacturing system 20 comprises a parametric design system 30; the parametric design system 30 comprises an estimate generator 32, a layout drawing generator 34, and a design drawing generator 36. The parametric design system 30 determines the parameters associated with components of an object based on: (a) the parameters associated with other components of the object; and (b) engineering rules and knowledge developed based on experience with objects similar to the engineered object 22.

The example system 20 further comprises factory automation machines 40, manufacturing facilities 42, and/or off-site assembly facilities 44. The factory automation machines 40, manufacturing facilities 42, and off-site assembly facilities 44 all are or may be conventional and will not be described herein beyond what is necessary for a complete understanding of the present invention.

Also depicted in FIG. 1 are system functions that employ human input. In particular, the entity ordering the engineered object 22 is identified as the customer and is indicated by reference character 50. The human involvement of the entity manufacturing the engineered object 22 is represented as a sales person 52 and an engineer 54. In addition, the entity manufacturing the engineered object 22 may further employ additional human functions such as purchasing, sales, marketing, accounting, and management, but these functions are only tangentially related to the system 20 and will not be described in detail herein.

The customer 50, sales person 52, and engineer 54 are not per se part of the design and manufacturing system 20 of the present invention but are integral to the design and/or manufacturing of the engineered object 22 using the system 20. Further, the functions performed by any of the customer 50, sales person 52, and/or engineer 54 may be, and typically are, performed by more than one individual.

FIG. 1 further illustrates that the example engineered object 22 is formed by the assembly of subassemblies 60a and 60b at the off-site assembly facilities 44. The subassemblies 60a and 60b are in turn formed by the assembly of manufactured components 62a, 62b, and 62c and procured components 64a rid 64b at the manufacturing facilities 42. For clarity, the engineered object 22, subassemblies 60, manufactured components 62, and procured components 64 are all depicted in highly schematic forms in FIG. 1.

In the context of a bulk material handling system, the manufactured components 62 are typically two-dimensional sheet metal components cut to be folded into three-dimensional structures; in this context, the procured components 64 are motors, sensors, belts, controllers, and the like that are assembled with the three-dimensional structures formed by the manufactured components 62 into the subassemblies 60 and eventually into the engineered object 22 in the form of a bulk material handling system.

The entity that manufactures the engineered object 22 may own and operate the parametric design system 30, the factory automation machines 40, and the manufacturing facilities 42. The on-site assembly facilities 44 may be owned and operated by an entity associated with the customer 50. However, in the context of modern manufacturing practices, it should be clear that the parametric design system 30, factory automation machines 40, manufacturing facilities 42, and on-site assembly facilities 44 may be owned and/or operated by other entities and located at widely distributed physical locations.

During the operation of the design and manufacturing system 20, numerous documents are generated. In the context of the present invention, the term "document" broadly refers to all forms of communication such as paper documents and computer files that represent design data associated with the design and manufacture of the engineered object 22. This design data can take a wide variety of forms, including text, drawings, databases, lists, and computer code. The following table identifies and describes certain documents that are used as part of the design and manufacturing system 20 as described in FIG. 1:

| Document Name | Ref. No. | Description |
|---|---|---|
| RFQ (Request for Quotation) | 70 | Generally - describes the performance requirements of the engineered object. Bulk Material Handling - describes properties of the proposed bulk material handling system such as the type of material to be carried and its properties, the amount to be carried per unit time, and locations where material feeds into the machine and is discharged from the machine. |
| Cost Estimate | 72 | Generally - summarizes the cost to manufacture the engineered object. Bulk Material Handling - summarizes the cost to manufacture the proposed bulk material handling system. |
| Layout Specifications | 74 | Generally - approval drawings, specifications, and the like of the engineered object. Bulk Material Handling - approval drawings, specifications, and the like describing the basic parameters of the proposed bulk material handling system. |
| Proposal | 76 | Generally - the combination of approval drawings and cost estimate related to an engineered object. Bulk Material Handling - the combination of approval drawings and cost estimate related to a proposed bulk material handling system. |
| Order | 78 | Generally - agreement by customer to |

-continued

| Document Name | Ref. No. | Description |
|---|---|---|
| | | purchase an engineered object as described in a proposal. Bulk Material Handling - agreement by customer to purchase a bulk material handling system as described in a proposal. |
| Detail Specifications | 80 | Generally - bill of materials and assembly drawings describing the manufactured and procured components of a particular engineered object and how these components are assembled to obtain subassemblies of a particular engineered object. Bulk Material Handling - bill of materials and assembly drawings describing the procured components and two-dimensional sheet metal components of a bulk material handling system and how these components are assembled to obtain subassemblies of a particular bulk material handling system. |
| Machine Control Files | 82 | Generally - computer files for controlling factory automation machines to manufacture custom components of a particular engineered object. Bulk Material Handling - flat pattern files for controlling CNC machines to form two-dimensional components from sheet metal that will eventually be formed into three-dimensional structures. |
| Assembly Specifications | 84 | Generally - assembly instructions for final assembly or subassemblies to obtain a particular engineered object. Bulk Material Handling - assembly instructions for final assembly of subassemblies to obtain a particular hulk material handling system. |

Figure 2:
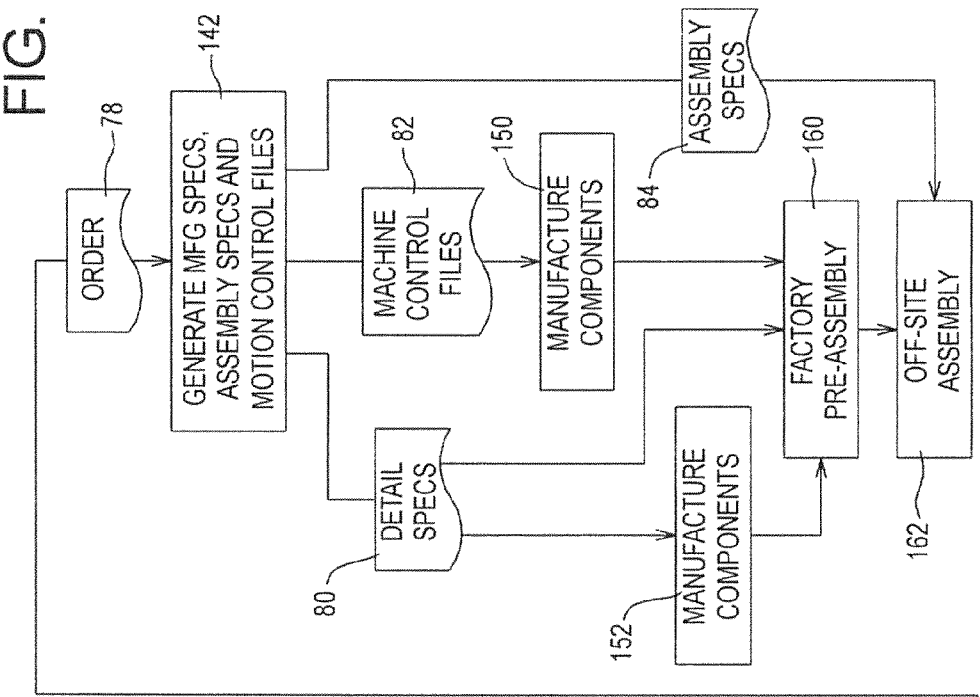
FIG. 2 is a flow diagram illustrating a method of using the system depicted in FIG. 1.
Figure 2:
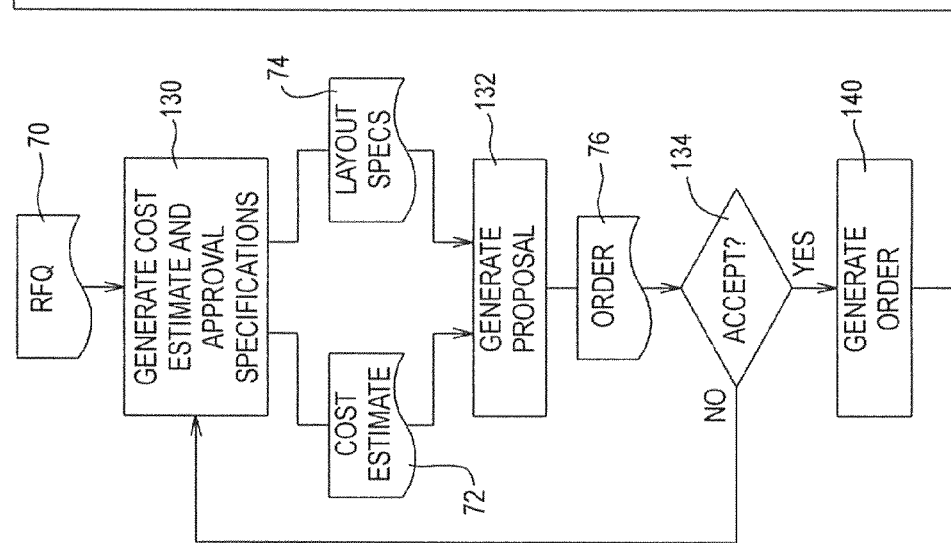

Referring now to FIG. 2, depicted at 120 therein is a method of using the example design and manufacturing system 20. The method 120 starts with the customer 50 providing an RFQ 70 to the sales person 52. Using the performance requirements described in the RFQ 70, at step 130 the sales person 52 uses the estimate generator 32 and layout drawing generator 34 to generate an initial cost estimate document 72a and an initial approval specification drawing 74a. The sales person 52 then generates an initial proposal 76a at step 130 and presents this proposal 76a to the customer 50 for acceptance at step 134.

In some situations, the customer 50 may accept the initial proposal 76a. In many situations, the customer 50 may reject the initial proposal 76a at step 134 for any one of a number of reasons such as the cost estimate 72a exceeding the budget, location or clearance problems, and/or a change of performance requirements since the generation of the original RFQ 70. In any of these situations, the process may return to step 130, and the sales person 52 may generate subsequent cost estimates 72b and possibly 72c and approval specifications 74b and possibly 74c. Based on these subsequent cost estimates 72b, 72c and approval specifications 74b, 74c, the sales person 52 may repeat step 132 to generate additional proposals 76b and possibly 76c until one of the proposals 76 is accepted at step 134.

When the customer 50 accepts one of the proposals 76 at step 134, the customer 50 generates an order 78 at step 140. The order 78, which contains or identifies the approval specifications 74 defining the engineered object 22, is forwarded to the engineer 54. As shown at step 142, the engineer 54 uses the design specifications generator 36 to generate the Detail Specifications, the machine control files 82, and the assembly specifications 84.

The machine control files 82 are sent to the factory automation machines 40 to control these machines 40 to manufacture the manufactured components 62 at step 160. The Detail Specifications 82 are used to identify and procure the procured components 64 at step 152. Using the Detail Specifications 80, the manufactured components 62 and the procured components 64 are combined to form the subassemblies 60 using the manufacturing facilities 42 at step 160.

In the example shown in FIG. 1, the manufactured components 62a and 62b and procured component 64a are combined to form the subassembly 60a, while the manufactured component 62c and the procured component 64b are combined to form the subassembly 60b. Typically, the subassemblies 60a and 6 Db are then shipped to the off-site assembly facilities 44 where they are assembled using the assembly specifications 84 at step 160 to form the engineered object 22.

With the foregoing general understanding of the principles of the present invention in mind, the details of construction and operation of the example design and manufacturing system 20 will now be described in detail.

Figure 3B:
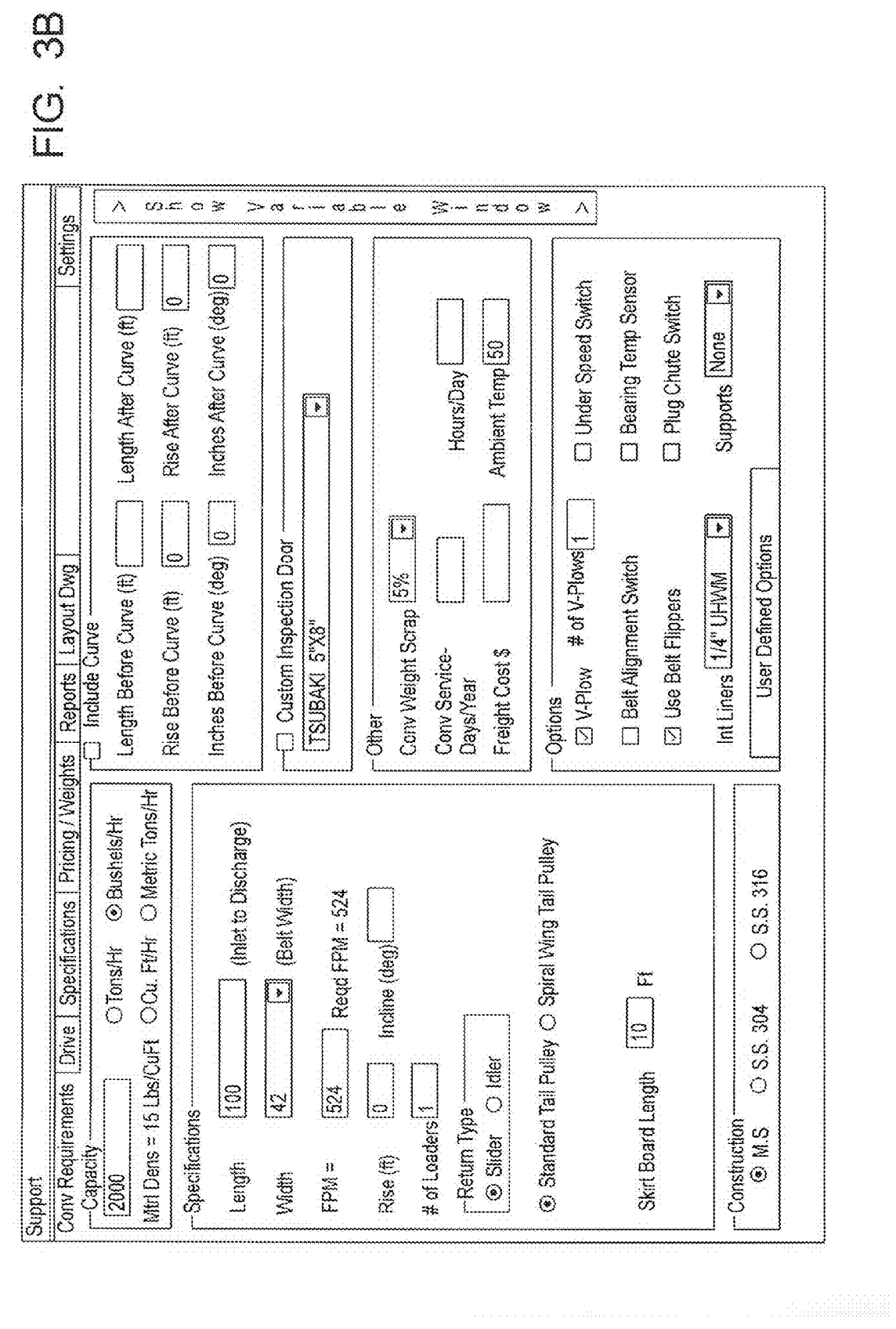

Referring now to FIGS. 3 and 3A-D of the drawing and Exhibits A and B attached hereto, the step 130 of the method 120 of using the example design and manufacturing system 20 will now be described in further detail. At an initial step 210, the sales person 52 uses the parametric design system 30 to create a new proposal using the software panel depicted in FIG. 3A. As shown in FIG. 3A, the sales person 52 enters data identifying the customer 50 and data, such as a proposal number, project reference name, and the like, of a proposa associated with a particular proposed bulk material handling system.

At step 212, the sales person 52 defines the properties of the proposed bulk material handling system using a software panel as shown in FIG. 38. The properties entered into the parametric design system 30 at step 212 numerically define the controlling parameters associated with bulk material handling systems. These controlling parameters include material to be conveyed, capacity, length, width, incline, construction materials, and available options.

Based on the properties entered at step 212, at step 214 the machine specifications are generated. FIG. 30 depicts a software panel summarizing the machine specifications for the properties entered in the software panel illustrated in FIG. 3B.

Based on the machine specifications, the parametric design system 30 generates the cost estimate 72 at step 220 and the layout specifications 74 at step 222. The cost estimate 72 is schematically depicted in FIG. 3, but a sample print-out of. The cost estimate associated with the machine specifications generated at step 214 is attached hereto as Exhibit A. The cost estimate 220 typically contains unit, line item, and total cost values, but these cost values are not per se relevant to the present invention and have been omitted from the sample cost estimate contained in Exhibit A. The cost estimate 72 is typically not directly disclosed to the customer 50 but is used by the sales person 52 to generate the proposal 76 as will be described in further detail below.

The parametric design system 30 further generates at step 222 the layout specifications 74 based on the machine specifications generated at step 214. The layout specifications 74 typically include a summary of the more important specifications and a layout drawing associated with the proposed bulk material handling system. A sample layout drawing is illustrated in FIG. 3D of the drawing. The layout specifications 74 are typically included in the proposal 6 along with a price based on the cost estimate 72.

In particular, a sample proposal is attached hereto as Exhibit B. The proposal in Exhibit B takes the form of a multiple-page word processing document that has been automatically generated based on information entered into and generated by the parametric design system 30. The sample proposal attached hereto contains on pages 1 and 2 boilerplate legal language associated with terms of sale, shipment obligations, freight options, and the like. Page 3 contains a summary of the important specifications and layout drawing of the proposed bulk material handling system generated from the layout specifications 74 and a price generated from the cost estimate 72. Pae 4 contains even more detailed specifications and price of the drive component of the proposed bulk material handling system.

Based on a proposal such as the sample proposal in Exhibit B, the customer determines whether the proposed new bulk material handling system and price as defined in the proposal are acceptable. If not, the sales person can easily and quickly generate additional proposals 76.

When a proposal 76 is ultimately accepted, the customer 50 generates the cr order 78. The order 78 obligates the customer 50 to purchase the proposed new bulk material handling system at the agreed upon price and obligates the sales entity to manufacture the new proposed bulk material handling system according to the specifications of the proposal 76. The order 78 may contain or refer to the accepted proposal 76.

The order 78 is passed to the engineer 54. The engineer 54 performs the step 142 of the method 120 using the example design and manufacturing system 20, and this step 142 will now be described in further detail with reference to FIGS. 4 and 4A-J.

As discussed above, the layout specifications 74 define basic, important characteristics of the proposed new bulk material handling system, especially those relating to price. However, the layout specifications 74 do not define the details of construction and assembly of the proposed new bulk material handling system. As generally described above, at step 142 the engineer 54 uses the parametric design system 30 to generate the detailed specifications 80, machine control files 82, and assembly specifications 84.

Initially, in a step 250 shown in FIG. 4, the engineer 54 defines the subassemblies identified in the layout specifications 74. As an example, in FIG. 4A the engineer 54 has identified the tail subassembly of the bulk material handling system identified in the layout specifications 74.

FIG. 4B illustrates a software panel that allows the engineer 54 to size the individual components of the tail subassembly. The panel of FIG. 4B starts with default numerical values but informs the engineer 54 of alternative numerical values available for each of the individual components. The engineer 54 thus uses personal knowledge, training, and experience to confirm the values associated with the tail subassembly under design. These values are generated by the parametric design system 30 based on the engineering rules embodied therein and the engineering specifications defined in the order 78.

When the values associated with the components of the tail subassembly are confirmed, the engineer 54 next directs the parametric design system 30 to generate component values associated with the tail subassembly design. In particular, the parametric design system 30 generates the component values based on the accumulated knowledge embodied in the engineering rules stored in the parametric design system 30 as will be described in further detail below.

The component values are then passed to a three-dimensional modeling system such as Solid Works. The three-dimensional modeling system generates a three-dimensional computer model representing the tail subassembly at step 254, and a sample two-dimensional view of the three-dimensional model of the tail subassembly is depicted in FIG. 4C.

The three-dimensional modeling system allows the tail assembly to be rendered in many different views and perspectives. The engineer 54 analyzes the three-dimensional model from different views and perspectives to determine, at step 256, whether a problem exists with the design of the tail subassembly.

Figure 4A:
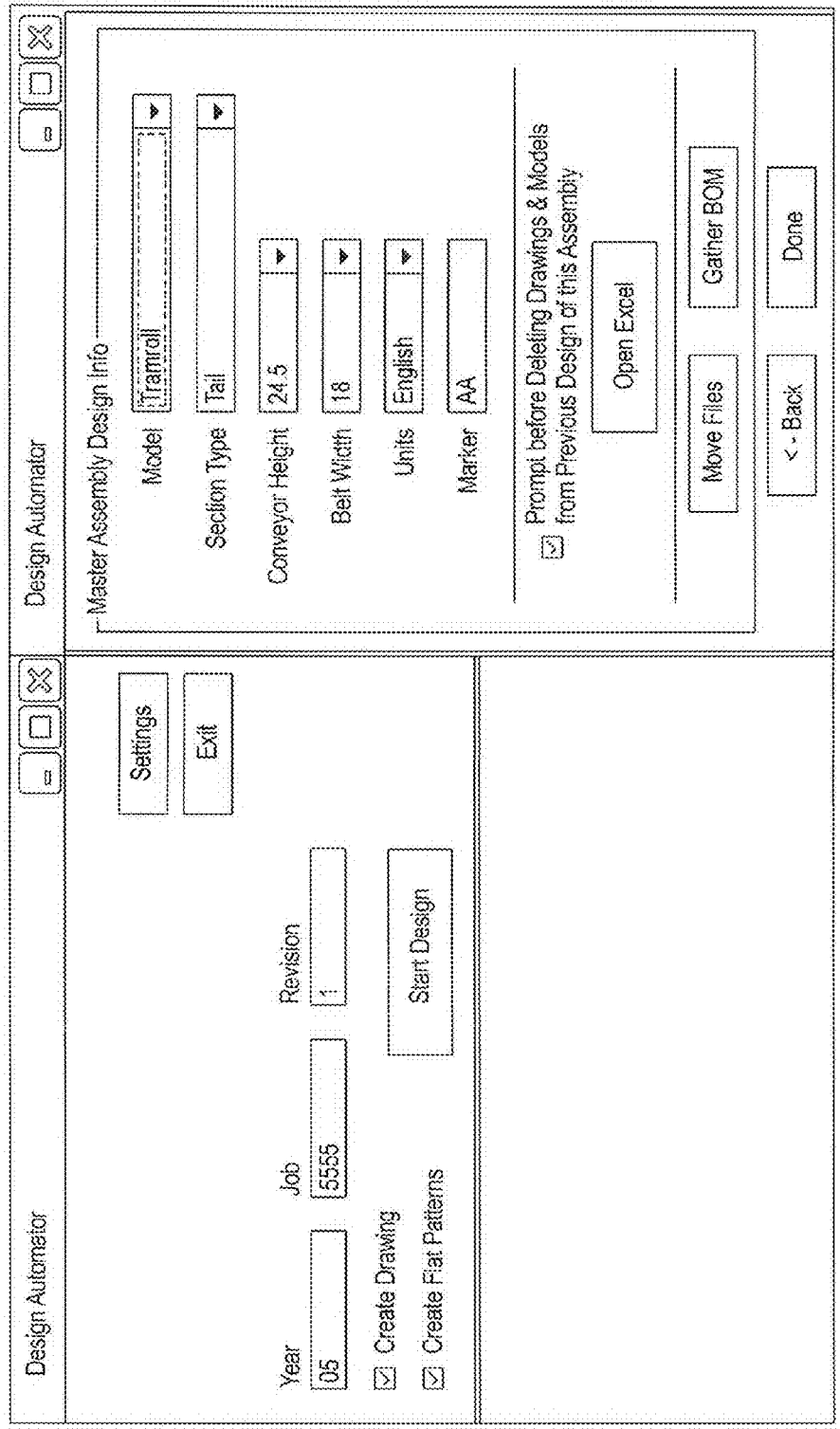
Figure 4C:
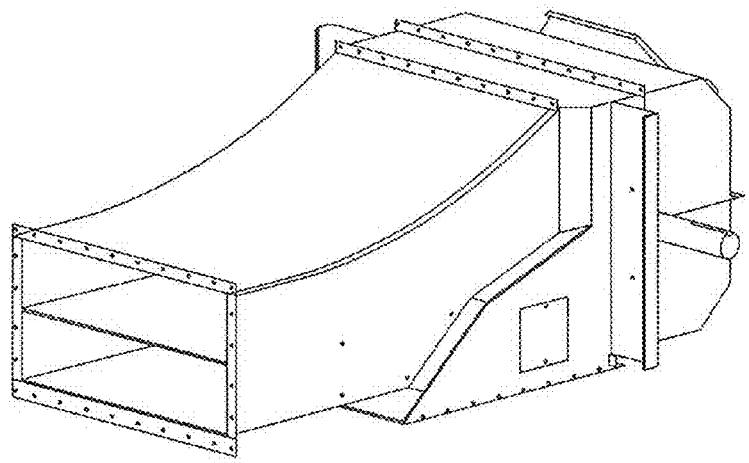
FIGS. 4C and 4D are views of an example three-dimensional model generated by the system of FIG. 1.
Figure 4D:
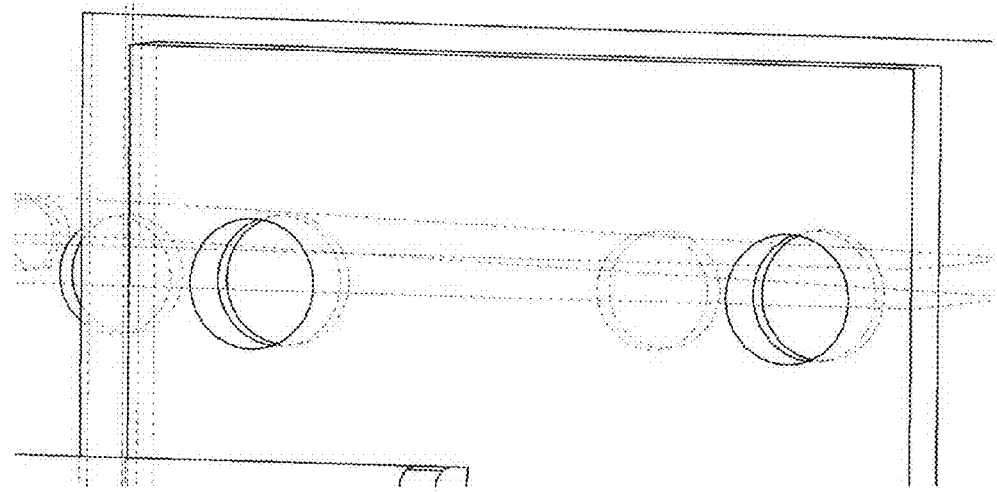
Figure 4F:
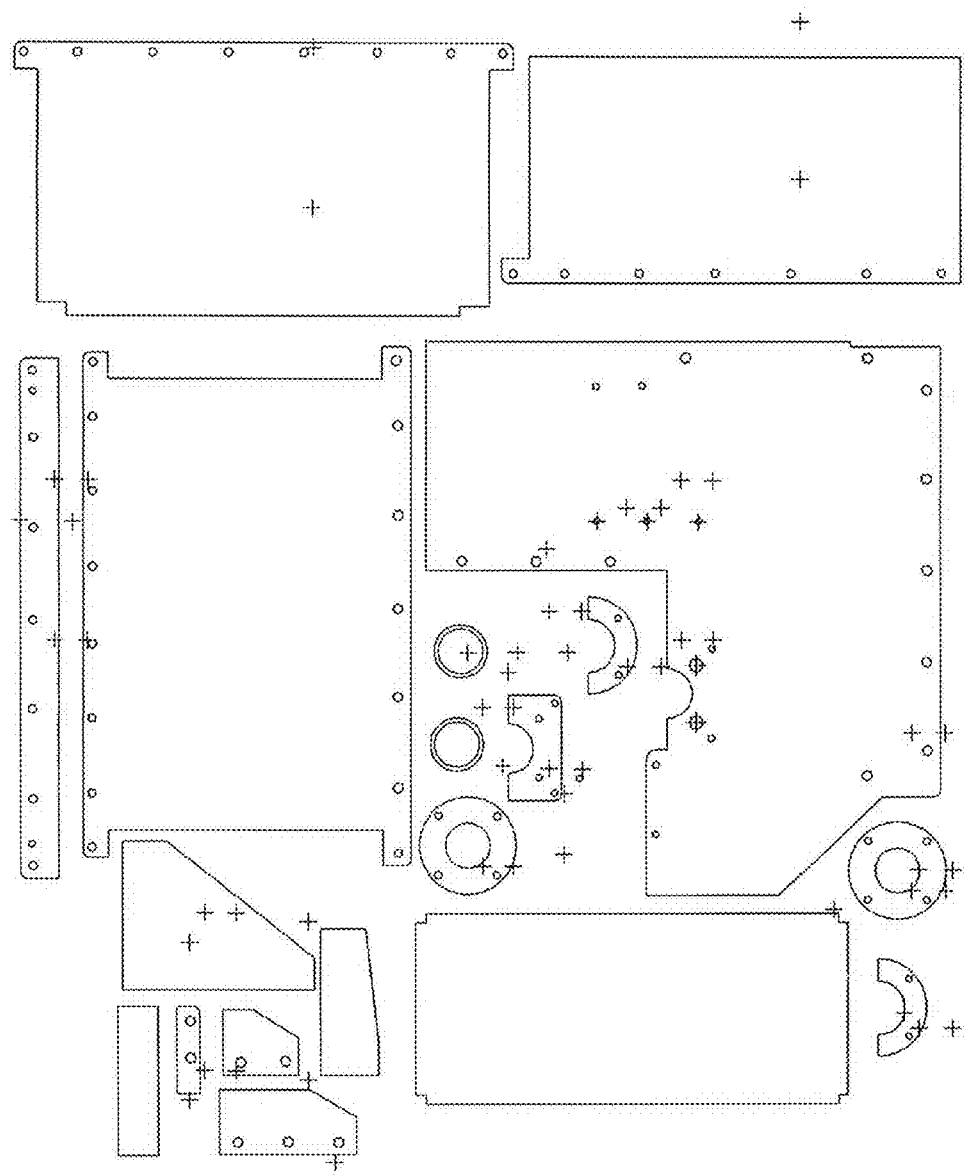

FIG. 4D is a view of the sample tail subassembly depicted in FIG. 4C illustrating misaligned holes 258a and 258b. The misalignment depicted in FIG. 4D is typically the result of an error in the engineering rules governing the relationships among components forming the subassembly.

Accordingly, if the engineer 54 determines at step 256 that a problem exists with the tail subassembly, the process proceeds to step 260 where the engineer revises rules contained in the engineering rules database of the parametric design system 30. After the rules have been properly revised, the method returns to step 254 where another three-dimensional model is generated based on the values selected or confirmed in step 252.

When the engineer 54 determines at step 256 that the three-dimensional model does not contain any problems, the parametric design system 30 passes values associated with the designed tail subassembly to a Computer Aided iii Drafting (CAD) program such as AutoCAD. As shown in FIG. 4E, at step 270 AutoCAD generates two-dimensional drawings based on the three-dimensional model that depict the tail subassembly, the components thereof, and instructions describing how to combine the components to form the subassembly. The two-dimensional drawings generated at step 270 form part of the detail specifications 80.

The parametric design system 30 further generates at step 270 a bill of materials such as depicted in FIG. 4G and associated documents for ordering procured parts such as a buy list, an example of which is shown in FIG. 4H, and a ship list, an example of which is shown in FIG. 4I. The example parametric design system 30 also generates at step 270 a fabrication list used during the factory pre-assembly step 160 described above.

As shown at step 272, AutoCAD generates flat pattern drawings as depicted in FIG. 4J defining how the manufactured parts are to be cut. AutoCAD further generates the motion control files 82 corresponding to the flat patterns.

Step 274 illustrates that the parametric design system 30 generates the assembly specifications 84, a sample of which is depicted at FIG. 4K of the drawing.

The fundamental principles of a parametric design system such as the parametric design system 30 used by the design and manufacturing system 20 are generally known and will not he described herein beyond what is required for a complete understanding of the present invention.

FIG. 5 illustrates an example parametric design system that may be used as the parametric design system 30 described above. Initially, the controlling parameters associated with a type of engineered object to be produced are defined at step 320. Next, an engineering rules database 322 is created at step 322. The engineering rules database 322 contains rules defining the components in associated with a given type of engineered object and the relationships among these components. The engineering rules database 322 of the example parametric design system 30 further contains cost information associated with these components.

At step 324, the user enters sizing information defining a particular engineered object to be designed. Based on the engineering rules database created at step 322 and the sizing data entered at step 324, at step 326 a machine specification 328 is generated.

The machine specification 328 can take many different forms. In the context of the example parametric design system 30, the machine specification may take the form of cost estimate 72, the approval specifications 74, the design specifications 80, and/or the assembly specifications 82.

From the foregoing, it should be apparent that the present invention may be embodied in forms other than those described and depicted herein with departing from the scope of the present invention. The scope of the present invention should thus be determined based on the claims attached hereto and not the foregoing detailed description of the invention.

What is claimed is:

1. A design system for generating an object design for producing an engineered object, the design system comprising:
    an estimate generator for generating a cost estimate based on at least one of
       a request for proposal defining the engineered object,
       components of the engineered object, and
       engineering rules and knowledge;
    a layout drawing generator for generating a layout drawing based on at least one of
       the request for proposal,
       the engineered object, and
       engineering rules and knowledge;
    a design generator for generating the object design based on a proposal and an order, where
       the proposal is generated based on the cost estimate and the layout drawing; and
       the order is generated based on the proposal; and
    manufacturing facilities for producing at least a portion of the engineered object based on the object design.

2. A system as recited in claim 1, further comprising an estimate generator interface for defining predetermined properties of the engineered object based on the request for proposal.

3. A system as recited in claim 2, in which the layout drawing generator generates the layout drawing based on the predetermined properties of the engineered object.

4. A system as recited in claim 1, in which the object design comprises an object model defining the engineered object.

5. A system as recited in claim 4, further comprising a review interface for generating an image of the object model to facilitate engineering review of the object design.

6. A system as recited in claim 5, in which:
    the object model is a three-dimensional computer model representing the engineered object; and
    the image is a two-dimensional representation of the three-dimensional computer model.

7. A method of generating an object design for producing an engineered object, comprising the steps of:
    providing an estimate generator for generating cost estimates at least in part based on a request for proposal defining the engineered object and engineering rules and knowledge;
    providing a layout drawing generator for generating layout drawings at least in part based the request for proposal and engineering rules and knowledge; and
    providing a design generator for generating object designs at least in part based on the request for proposal, engineering rules and knowledge, and an engineering review;
    accepting a request for proposal defining the engineered object;
    entering the request for proposal into the estimate generator to generate a cost estimate;
    entering the request for proposal into the layout drawing generator to generate a layout drawing;
    generating a proposal based on the cost estimate and the layout drawing;
    generating an order based on the proposal;
    based on the order and the proposal, causing the design generator to generate an assembly specification, a detail specification, and machine control files comprising the object design; and
    producing at least a portion of the engineered object based on the object design.

8. A method as recited in claim 7, in which the step of generating the object design comprises the step of generating an object model defining the engineered object.

9. A method as recited in claim 8, in which:
    the step of generating the object model comprises the step of generating a three-dimensional computer model representing the engineered object; and
    the step of generating the image comprises the step of generating a two-dimensional representation of the three-dimensional computer model.

10. A method of generating a bulk material handling system design for producing a bulk material handling system, comprising the steps of:
    providing an estimate generator for generating cost estimates for bulk material handling systems based on requests for proposal;
    providing a layout drawing generator for generating layout drawings; and
    providing a design generator for generating object designs at least in part based on at least one of parameters associated with components of bulk material handling systems, engineering rules and knowledge related to bulk material handling systems, and an engineering review;
    accepting a request for proposal defining a bulk material handling system design;
    entering the request for proposal into the estimate generator to generate a cost estimate;
    entering the request for proposal into the layout drawing generator to generate a layout drawing;
    generating a proposal based on the cost estimate and the layout drawing;
    generating an order based on the proposal;
    based on the order and the proposal, causing the design generator to generate an assembly specification, a detail specification, and machine control files comprising the bulk material handling system design; and
    producing at least a portion of the bulk material handling system based on the bulk material handling system design.

11. A method as recited in claim 10, further comprising the steps of:
    providing an estimate generator interface; and
    defining predetermined properties of the bulk material handling system using the generator interface, where the cost estimate generator generates the cost estimate further based on the predetermined properties of the bulk material handling system.

12. A method as recited in claim 11, in which the step of generating the layout drawing comprises the step of generating the layout drawing based on the predetermined properties of the bulk material handling system.

13. A method as recited in claim 10, further comprising the steps of:
   providing a specifications interface; and
   defining specifications of the bulk material handling system using the specifications interface.

14. A method as recited in claim 13, further comprising the steps of:
   providing an estimate generator interface; and
   defining predetermined properties of the bulk material handling system using the specifications interface.

15. A method as recited in claim 10, in which the step of generating the object design comprises the step of performing an engineering review of a preliminary object design.

16. A method as recited in claim 15, in which the step of performing the engineering review of the preliminary object design further comprising the steps of:
   providing a review interface; and
   performing the engineering review of the object design using the review interface.

17. A method as recited in claim 16, in which the step of generating the object design comprises the step of generating a bulk material handling system model defining the bulk material handling system.

18. A method as recited in claim 17, in which the step of performing the engineering review further comprises the steps of:
   providing a review interface; and
   generating an image of the bulk material handling system model using the review interface.

19. A method as recited in claim 18, in which:
   the step of generating the bulk material handling system model comprises the step of generating a three-dimensional computer model representing the bulk material handling system; and
   the step of generating the image comprises the step of generating a two-dimensional representation of the three-dimensional computer model.

* * * * *